UNITED STATES PATENT OFFICE.

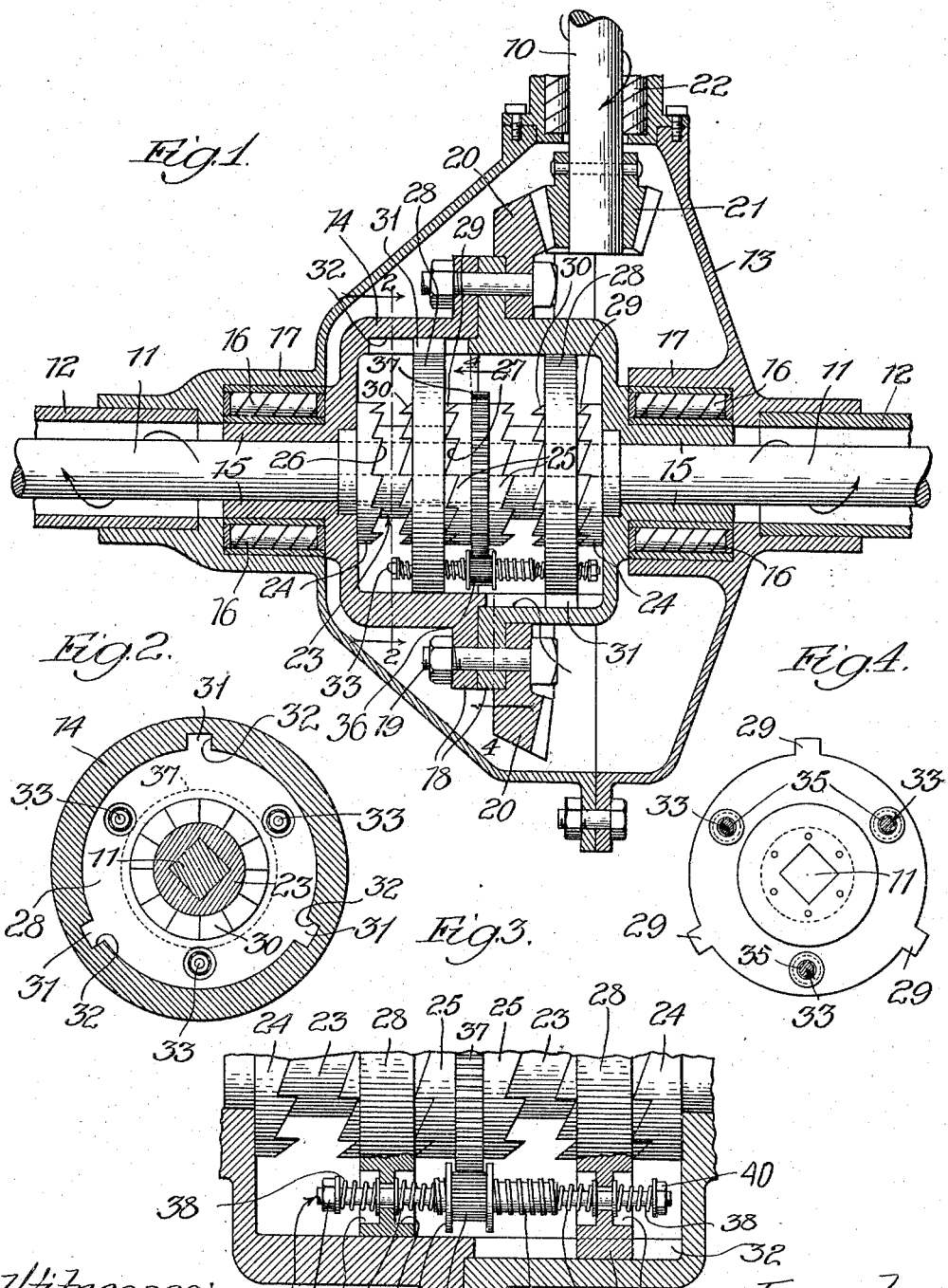

WILLIAM H. BROWN, OF CHICAGO, ILLINOIS.

DIFFERENTIAL MECHANISM.

1,308,520.  Specification of Letters Patent.  Patented July 1, 1919.

Application filed July 16, 1917. Serial No. 180,733.

*To all whom it may concern:*

Be it known that I, WILLIAM H. BROWN, a citizen of the United States, residing at Chicago, in the county of Cook and State of Illinois, have invented new and useful Improvements in Differential Mechanism, of which the following is a specification.

This invention relates to a differential mechanism, and more particularly to a differential mechanism of that character ordinarily employed in the construction of motor vehicles and the like, its function being to effect the transmission of power from a single drive shaft, driven by the motor, to separate driven shafts, upon which are mounted the drive wheels, and at the same time permit one or the other of the wheels to rotate at a greater speed when the vehicle is moving in a curvilinear path.

As applied to motor vehicles, a differential mechanism is ordinarily located in and forms a part of the rear axle of the vehicle and comprises an arrangement of rotative members intermediate the drive shaft and the separate driven shafts, and so constructed as to operate automatically to permit the increased speed of the outside wheel (that is, the wheel which describes the arc of greater radius) without interrupting the transmission of power to at least one of the driving wheels.

The purpose of this invention is to provide a novel construction for a differential mechanism, departing from the usual arrangement employed, whereby certain advantageous results are obtained, which will be hereinafter clearly pointed out.

The novel features embodying the invention are illustrated in the accompanying drawings, wherein—

Figure 1 is a view in longitudinal section of the differential mechanism and associated parts;

Fig. 2 is a cross-sectional view taken on line 2—2 of Fig. 1;

Fig. 3 is an enlarged fragmentary view of the members of the device, showing the shifting mechanism; and Fig. 4 is a cross-sectional view taken on line 4—4 of Fig. 1.

The differential mechanism and parts connected therewith comprise, in general, a drive shaft 10, which extends rearwardly from the motor at right-angles to the rear axle; two separate driven shafts 11, 11, inclosed within the rear axle housing consisting of tubular members 12, 12, which form, together with an enlarged housing 13, the rear axle of the vehicle. At the ends of the separate shafts 11, 11 are mounted the rear wheels (not shown), in the usual manner.

Within the housing 13, hereinafter termed the differential housing, is contained the differential mechanism, said housing being substantially cylindric in form, though slightly irregular in shape in order to conform to the general shape of the parts within and to minimize the space occupied thereby.

Referring more in detail to the differential mechanism, the same comprises, as its main element, a cylindric shaped casing or drum 14, adapted to rotate about an axis coinciding with the axes of the driven shafts 11, 11, and for this purpose provided at opposite ends with tubular bearing sleeves 15, 15, which surround the driven shafts and project into annular spaces, in which are mounted antifriction roller bearings 16, 16, the latter being surrounded by tubular extensions 17, 17 at the ends of the differential housing 13. The drum or casing 14 preferably consists of two parts or halves, bolted together at the center of the drum by the provision of marginal flanges 18 and bolts 19. Rigidly fixed to the drum and surrounding the central portion thereof is a beveled gear wheel 20, which is fastened by means of said bolts 19, which securely connect the same to the flanges 18, 18. The gear wheel 20 rotates with the drum 14 and meshes with a beveled pinion 21 mounted on the end of the drive shaft 10, which extends into the differential housing and is supported at the point of entrance by a roller bearing construction 22.

Within the drum or casing 14 is formed an elongated, cylindrical shaped chamber, which contains other members of the mechanism, arranged as follows: Upon the inner ends of the driven shafts 11, 11, which extend into said drum and terminate in close proximity and at the center thereof, are mounted hub-members 23, 23, said hub-members being rotative with the driven shafts and preferably connected thereto, by the provision of axial bores, rectangular in contour, which engage squared end portions of the shafts 11, 11. Each of these hub-members occupies substantially one-half the length of the space within the drum 14, although a space is provided between them, for a purpose hereinafter set forth. Each of these hub-members is provided at opposite ends with flanges 24, 25, the opposed faces of said flanges being provided with radial ratchet teeth 26 and 27, respectively. The ratchet teeth are cut or formed in opposed relation, that is, the contact faces of the teeth 26 face in one direction, whereas the contact faces of the teeth 27 face in the opposite direction. Between the flanges 24 and 25 of each hub-member, is a plain cylindric bearing surface. Mounted upon each hub-member is a shift ring 28 surrounding the central bearing portion intermediate the flanges and adapted to be shifted endwise thereon. Upon the opposite faces of each ring are provided sets of ratchet teeth 29 and 30, adapted to engage the sets of teeth 26 and 27, respectively, of the hub-members. Arranged about the periphery of each ring are lugs 31 projecting outwardly and engaging a series of grooves 32, 32, formed upon the inner surface of the drum and extending longitudinally thereof, each series of grooves 32, 32 extending from the central portion of the drum outwardly toward the ends thereof. By the arrangement thus employed, the shift rings 28, 28 rotate with the drum and at the same time are capable of endwise movement upon the central bearing portion of the hub-members and into and out of locking connection with the end flanges of the hub-members, through the medium of the ratchet teeth. The flanges 24, 25, are rigidly connected with the hub members 23 so as to rotate therewith, but the connection of each flange 25 is such that the latter may be placed on the hub member 23 after the associated shift ring 28 has been applied thereto.

As shown in the drawings, the left-hand shift ring engages the ratchet teeth 27 of the inner flange 25 of its associated hub-member, whereas the right-hand ring engages the teeth 26 of the outer flange 24 of its associated hub-member, this being the preferable arrangement of the rings for driving the vehicle in a forward direction, as indicated by the arrows in Fig. 1. Thus, when the rings are shifted to the right-hand end of their hub-members and into locking engagement therewith, the drum 14 is positively connected to the hub-members and driven shafts, so that power is transmitted positively to the latter. It is to be noted in this connection that the ratchet teeth at the right-hand end of each hub-member are identical in arrangement, whereas the left-hand sets of ratchet teeth are similar to each other in arrangement, but reversed with respect to the opposed sets of teeth.

Now, if the direction of rotation of the drum were reversed, it is evident that the sets of ratchet teeth would become disengaged and the rings shifted toward the shaft, and, furthermore, in order that the shift rings again connect the drum and hub-members, that locking connection must be established between the left-hand sets of ratchet teeth and the shift rings. In order to insure the positive shifting of the rings and to connect them together to effect their movement in unison, the following construction is employed:

Extending through the peripheral portions of the rings are a plurality of connecting pins or rods 33, preferably three in number, arranged at angles of 120° apart, as shown in Figs. 2 and 4, and in concentric relation about the common axis of the rotative parts, said rods extending through openings formed in said rings and a short distance beyond, the portion of the rings surrounding the openings being preferably reduced in thickness by the provision of circular depressions 34 formed on opposite sides of each ring. At the central portion of each rod is provided an enlarged hub 35 having a helical thread extending from left to right throughout its length. Mounted upon each hub 35 is a small pinion 36 having threaded engagement with the hub and capable of producing relative endwise movement between the same and the rod, when the latter is rotated. Each pinion is preferably provided with end flanges 36ª, which extend outwardly beyond the teeth. The purpose of these flanges will be hereinafter set forth. Mounted between the hub-members 23, 23 is a circular plate 37, of substantially the same diameter as the flanges of said hub-members and provided with peripheral gear teeth. This plate meshes with the several pinions, which are so arranged as to retain or support the plate at three points. The plate is disconnected from the hub-members, but the latter preferably have sufficient bearing or frictional engagement against opposite sides of the plate to effect the rotation of the plate with the hub-members, under normal operation of the device, but this frictional engagement is not so great as to prevent the relative rotation between the parts as is occasioned when one of the hub-members is rotated at a greater or less speed than the other. Mounted upon each rod 33, and on opposite sides of each ring, are pairs of springs 38 and 39, the inner pair 39 extending between the central hub 35 and each ring, and the outer pair from the rings to the ends of each rod, there being provided nuts 40 at said ends to retain the springs in position. The springs are preferably of equal size and length in order that they may exert the same degree of tension, thus producing a balanced condition between the springs, as will be hereinafter understood. The function of the rods 33 and parts thereof is confined to the shifting of the rings when the direction of the vehicle is reversed from forward to backward, and hence when the direction of rotation of the drum 14 and shift rings 28, 28 is reversed. During the interval the reversal is taking place, the power transmitted is practically zero, since a vehicle is ordinarily brought to rest in reversing—hence it is to be understood that the rings are capable of being shifted with but little effort, and further that the hub-members would ordinarily be rotating at the same speed and carrying with them the plate 37.

The operation of the shifting mechanism will be understood from the following: Assuming that the parts are in the position shown in Figs. 1 and 3, and the vehicle is being driven in the forward direction, the driving shaft is positively connected to both driven shafts through the engagement of the ratchet teeth of the shift rings and hub-members, and all parts rotate together at the same rate of speed. Now, if the vehicle makes a turn, as around a corner, say, to the left, it is clear that the right-hand wheel and driven shaft will rotate at a greater speed while the turn is being negotiated. This increased speed is compensated for by the disengagement of the ratchet teeth of the right-hand hub-member and shift ring, the latter being shifted to the left a distance to permit the disengagement of the teeth and the increased speed of rotation of the hub-member, which is accompanied by the passing of the teeth over each other until uniform speed is resumed, whereupon the teeth again become engaged and the power is transmitted to the right-hand wheel as before. During this shifting of the ring out of engagement, there is a slight endwise movement to the left, which is opposed by the springs 39 on the rods 33, the rods, however, remaining undisturbed. The same springs 39 also act to force the rings into engagement with the hub-members when driving connection is resumed. The same is true of the left-hand members when the vehicle makes a turn to the right.

Now, if it is desired to reverse the vehicle to travel in a backward direction, the drum will be rotated in the opposite direction, carrying the shift rings with it. By reason of the arrangement of the ratchet teeth, both shift rings will obviously be disconnected from the hub-members and shift endwise toward a position between the two sets of ratchet teeth, although opposed in this movement by the springs upon the rods 33. At the instant disconnection takes place, there is a relative rotation between the rings and the hub-members, the latter including the plate 37; in other words, the rings will rotate about the hub-members and so will the pinions 36 rotate about the plate 37. This rotation imparts a rotative movement to the pinions, producing a relative endwise movement between the same and the rods 33, by reason of their threaded connection with the hub-portions thereof. The pinions are restrained from endwise movement by the end flanges 36ª, 36ª, which engage the plate 37, thus the rotative movement of the pinions effects the endwise movement of the rods in a direction not only to relieve the tension exerted by the springs, but to shift the rings toward the left and into engagement with the opposite set of ratchet teeth, thus restoring the connection between the drum and driven shafts for driving the vehicle in the opposite direction. When the vehicle is again reversed, the shifting mechanism operates in the same manner to shift the rings in the opposite direction, it being manifest that the purpose of this mechanism is to aid in the shifting of the rings when reversal takes place, thus insuring the shifting of the rings to secure a positive disengagement and engagement of the sets of ratchet teeth.

The members of the device constitute an intermediate driven member, embracing parts having positive connection with the driving shaft and with each driven shaft, said parts having ratchet-toothed connection, which is automatically and temporarily released by the increased speed of either of the driven shafts. Furthermore, provision is made for reversing the direction of the vehicle, by the provision of sets of oppositely disposed teeth, which operate only when the vehicle is driven in the opposite direction, and, furthermore, means for insuring the shifting of the rings to bring about the immediate and positive engagement of the proper sets of ratchet teeth.

The novel features of the invention are more specifically pointed out in the appended claims.

I claim as my invention:

1. In a differential mechanism, the combination of a drive shaft, separate driven shafts, an intermediate driven member, comprising shiftable members provided with ratchet teeth, said shiftable members being rotatively mounted on said driven shafts between sets of ratchet teeth on said driven shafts, and means including a member engaging said driven shafts between said shiftable members for effecting the shifting of the latter into and out of engagement with the sets of ratchet teeth on said driven shafts upon the relative rotation of said driven shafts and said shiftable members.

2. In a differential mechanism, the combination of a drive shaft, separate driven shafts, an intermediate driven member comprising shiftable members provided with ratchet teeth, said shiftable members being rotatively mounted on said driven shafts between sets of ratchet teeth on said driven shafts, and means including a member interposed between the opposed ends of said driven shafts and having engagement therewith for effecting the shifting of said shiftable members into and out of engagement with the sets of teeth on said driven shafts upon the relative rotation of said driven shafts and said shiftable members.

3. In a differential mechanism, the combination of a drive shaft, separate driven shafts, an intermediate driven member, comprising shiftable members provided with ratchet teeth, said shiftable members being rotatively mounted on said driven shafts between sets of ratchet teeth on said driven shafts, a circular plate interposed between the opposed ends of said driven shafts and having frictional engagement therewith, and means connecting said shiftable members together and having operative connection with said plate for effecting the shifting of said shiftable members into and out of engagement with the sets of ratchet teeth on said driven shafts upon the relative rotation of said driven shafts and said shiftable members.

4. In a differential mechanism, the combination of a drive shaft, separate driven shafts, an intermediate driven member, comprising shiftable members provided with ratchet teeth, said shiftable members being rotatively mounted on said driven shafts between sets of ratchet teeth on said driven shafts, a circular plate interposed between the opposed ends of said driven shafts and having frictional engagement therewith, an endwise movable rod connecting said shiftable members together, a rotative member mounted on said rod and having power transmitting connection with said plate, and means connecting said rotative member with said rod whereby the latter may be moved endwise upon the rotation of said plate relative to said shiftable members.

5. In a differential mechanism, the combination of a drive shaft, separate driven shafts, an intermediate driven member, comprising shiftable members in positive driving connection with said drive shaft and rotatively mounted on said driven shafts, separate means for connecting said shiftable members and driven members when the shiftable members are rotated in opposite directions, and means, operated by the relative rotation of said driven shafts and shiftable members, for shifting the latter, comprising a rod connecting said shiftable members, a gear member rotative with said driven shafts, a pinion mounted on said rod and meshing with said gear member and arranged on said rod to impart endwise movement thereto when the same is rotated.

6. In a differential mechanism, the combination of a drive shaft, separate driven shafts, an intermediate driven member, comprising a rotative drum in driving connection with said drive shaft, shift rings rotative with said drum and mounted on said driven shafts, said driven shafts and rings being provided with sets of complementary ratchet teeth, and means for shifting said shift rings, comprising a rod yieldingly connecting said rings, a pinion mounted on said rod in threaded engagement therewith, and a gear member rotative with said driven shafts and meshing with said pinion.

7. In a differential mechanism, the combination of a drive shaft, separate driven shafts, an intermediate driven member embracing a rotative drum in driving connection with said drive shaft, shift rings rotative with said drum and mounted on said driven shafts, said rings and shafts being provided with complementary sets of ratchet teeth acting to connect and disconnect the same, a rod yieldingly connecting said shift rings, a pinion mounted on said rod and engaging a threaded portion thereof, and a gear member rotative with said driven shafts and engaging said pinion, the latter being rotated in the relative rotation of said shift rings and driven shafts, to impart endwise movement to said rod.

In testimony that I claim the foregoing as my invention, I affix my signature in the presence of two witnesses, this 9th day of July, A. D. 1917.

WILLIAM H. BROWN.

Witnesses:
 CHARLES H. POOLE,
 CLARA L. PEOPLES.